(No Model.)  2 Sheets—Sheet 1.
B. F. SPOONER.
SAW TEMPLET.
No. 503,010. Patented Aug. 8, 1893.
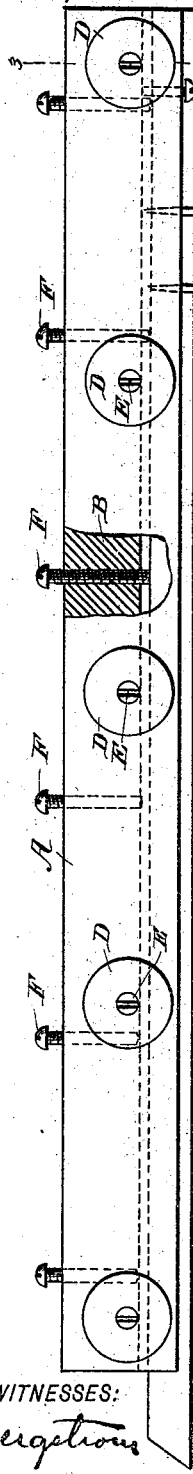
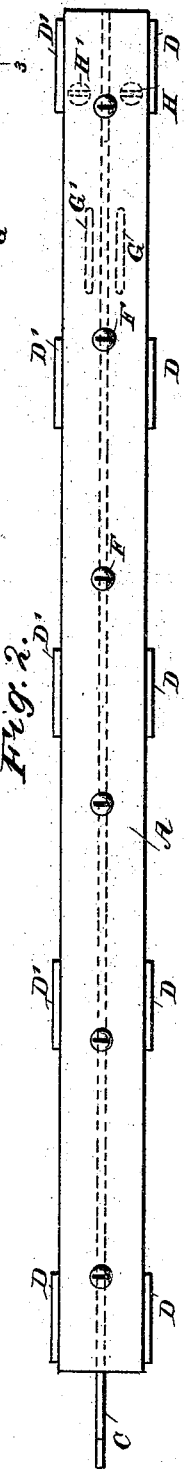
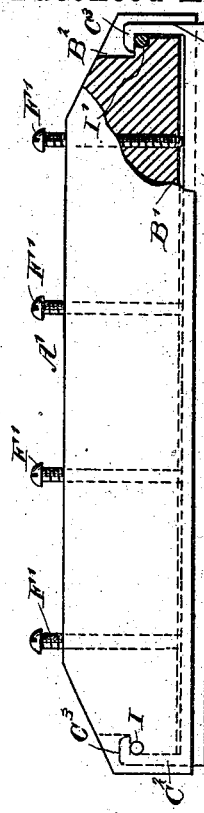
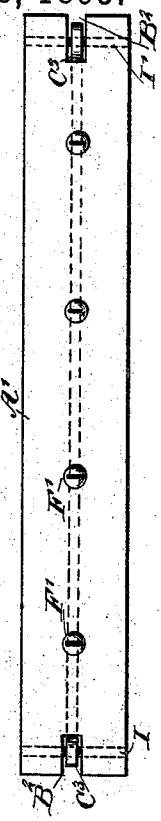
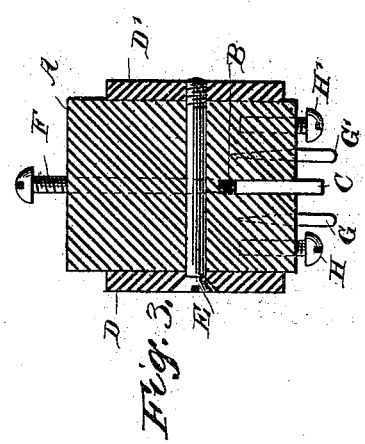
WITNESSES:
J. A. Bergstrom
C. Sedgwick
INVENTOR
B. F. Spooner
BY Munn & Co
ATTORNEYS.

(No Model.) 2 Sheets—Sheet 2.
B. F. SPOONER.
SAW TEMPLET.
No. 503,010. Patented Aug. 8, 1893.
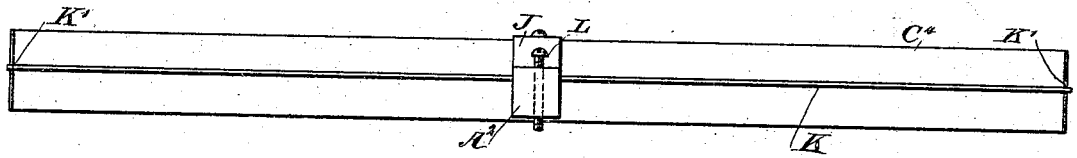
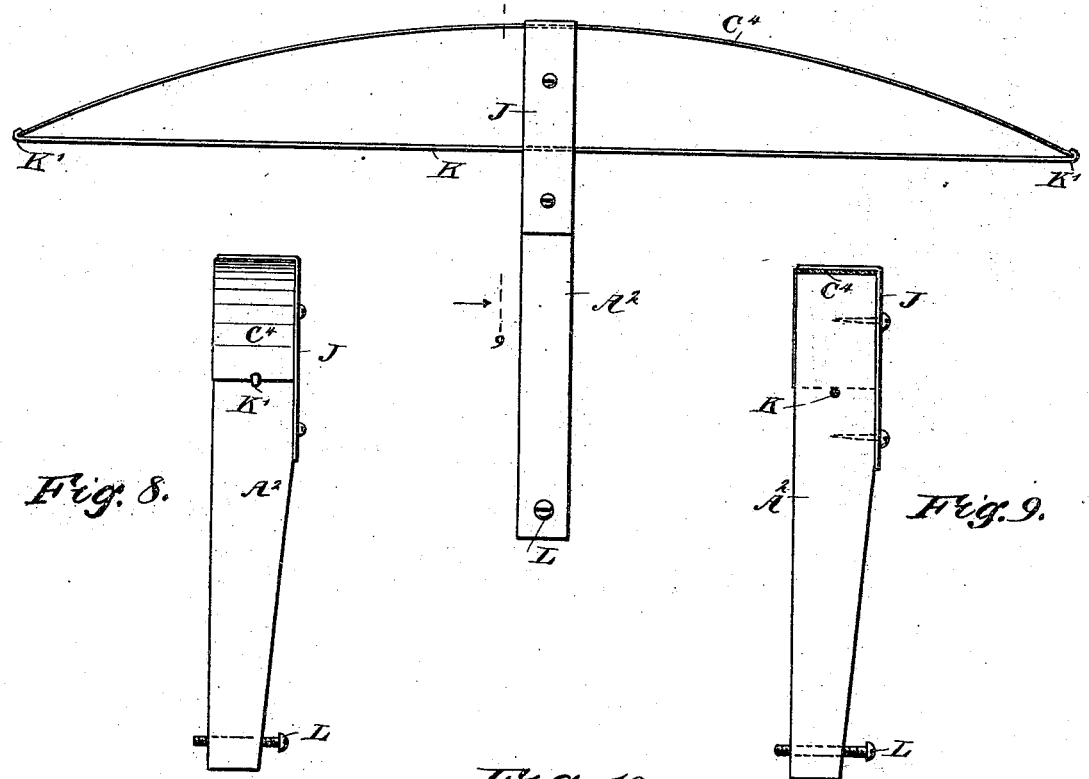
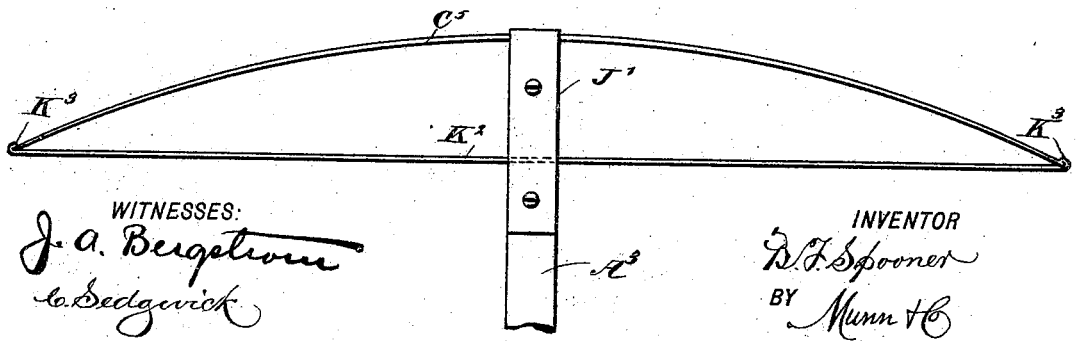
WITNESSES:
J. A. Bergstrom
C. Sedgwick
INVENTOR
B. F. Spooner
BY Munn & Co
ATTORNEYS.

UNITED STATES PATENT OFFICE.

BENJAMIN F. SPOONER, OF ORANGE, TEXAS.

SAW-TEMPLET.

SPECIFICATION forming part of Letters Patent No. 503,010, dated August 8, 1893.

Application filed February 6, 1893. Serial No. 461,205. (No model.)

*To all whom it may concern:*

Be it known that I, BENJAMIN F. SPOONER, of Orange, in the county of Orange and State of Texas, have invented a new and Improved Saw-Templet, of which the following is a full, clear, and exact description.

The object of the invention is to provide a new and improved saw templet, which is simple and durable in construction, very effective in operation, and designed for conveniently examining and marking saws to correct faults in the saw blade by means of the usual hammering process.

The invention consists of a stock or holder, a flexible band held adjustably therein, and means for adjusting the band to the desired curve.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a side elevation of the improvement partly in section, and arranged for use on circular saws for straightening and tensioning. Fig. 2 is a plan view of the same. Fig. 3 is an enlarged transverse section of the same on the line 3—3 of Fig. 1. Fig. 4 is a side elevation with parts in section, of the improvement as arranged for tensioning and cross-wise work on band saws. Fig. 5 is a plan view of the same. Fig. 6 is an end view of the improvement, as arranged for straightening the rims of circular saws. Fig. 7 is a plan view of the same. Fig. 8 is a side elevation of the same. Fig. 9 is a sectional side elevation of the same on the line 9—9 of Fig. 7; and Fig. 10 is a plan view of a modified form of the same.

The improved saw templet, as illustrated in Figs. 1, 2 and 3, is provided with a stock or holder A, formed in its under side with a longitudinally-extending groove B, in which is held adjustably, the band C made of steel or other suitable material in the form of a straight edge, as plainly shown in the said figures. The lower edge of the band C extends a suitable distance below the bottom of the stock or holder A, and the said band is clamped in place in the groove B, by sets of disks, each composed of the disks D and D', arranged on opposite sides of the stock A and connected with each other by a screw E, passing transversely through the stock, as will be readily understood by reference to Fig. 3. The top edge of the band C is engaged by a series of screws F screwing in the stock A from above and placed suitable distances apart, as indicated in Fig. 1, the said screws serving to bend the band C.

Near one end of the stock A and at the under side thereof, and on opposite sides of the band C are arranged the staples G and G', adapted to engage the eye of the saw, as hereinafter more fully described.

Between the staples G, and the nearest end of the stock A are arranged the set screws H and H', located on opposite sides of the band C, as plainly shown in Figs. 1 and 3; also in dotted lines in Fig. 2.

By adjusting the screws E, the clamping disks K, D', close the sides of the groove B, so as to clamp the band C in position on the holder A. The screws F, when adjusted serve to spring the flexible band C, so that by a proper manipulation of the said screws in connection with the sets of clamping disks, the edge of the band may be made concave or convex, and the position of the sharpest curve regulated, as desired. The set screws H serve to gage the contact of the lower edge of the band C, with the saw, at the eye of the saw, the heads of the screws resting on the blade usually at or near the place reached by the edge of the saw collars. The staples G and G' enter the eye of the saw, and thereby assist in keeping the implement in position at that point.

To operate with this instrument, it is first adjusted to the size of the saw by moving the band C endwise in its groove until the outer end reaches near the base of the teeth, the staples G and G', being in the eye of the saw blade. To adjust the edge to the saw, the end is rested at the base of the teeth upon the blade and the staples G, G' are placed in the eye and with the set screws H, H', and the clamping disks D, D', and screws E, the edge of the band is brought throughout its length very nearly in contact with the saw. The latter is lightly coated with some oily or other substance, which marking will show plainly. In spreading this coating it is rubbed back and forth from eye to rim, and then the instrument is placed in position, as described, and passed carefully around the saw, the instrument swinging from the staples G, G', as the pivot. If properly adjusted, the band will come in contact with the saw in a few spots between the eye and rim and the marking or coating substance will plainly show the spots. If less marking than the operator desires or more of it appears, then the instrument is re-adjusted, and again moved over the saw, as described. The marking thus produced on the saw is the operator's guide for hammering the saw into the proper shape.

As illustrated in Figs. 4 and 5, the device is arranged for tensioning and cross-wise work on band saws, and in this case the stock or holder A' is provided in its under side with a groove B', containing the band or blade C', formed at its ends with upwardly-extending arms $C^2$ provided at their upper ends with hooks $C^3$ hooking onto transversely-extending pins I and I' secured in the stock or holder A', the arms $C^2$ and hooks $C^3$ passing into slots $B^2$ formed in the ends of the stock or holder A'.

Set screws F' screw downward in the stock or holder A', to engage the upper edge of the band or blade C' to adjust the latter. By adjusting the set screws F', the flexible band or blade C' may be readily sprung the required amount and held in position without undue strain. The hooks $C^3$ engaging the pins I, I', securely hold the blade or band C' in proper position. In operating with this instrument, it is used cross-wise of the saw, the amount and position of the curve or tension being regulated by the operator, as he desires, with the set screws F' provided for that purpose.

As shown in Figs. 6 to 10, inclusive, the device is arranged for straightening the rims of circular saws, and in this case, the stock $A^2$ is provided at one end with a keeper J secured in place on the stock by screws and engaging at its outer end at the end of the holder $A^2$ the middle portion of the band $C^4$ which is bent to segmental shape by engaging its ends with hooks K' formed on the ends of a rod K passing through the stock $A^2$. A set screw L is arranged on the lower end of the stock $A^2$. The band $C^4$ is bowed sidewise to conform nearly to the curve of the rim of the saw, and is held in this position by the rod K, as before described.

In using this instrument it is placed in contact with the saw with the band $C^4$ resting on the saw blade near the base of the teeth, the other end of the holder $A^2$ containing the set screw L being arranged toward the eye of the saw, with the point of the set screw L resting on the saw blade. By advancing or receding the set screw L, the band $C^4$ can be fitted to the saw blade, as the operator may desire.

In marking a saw with the oily coating, the instrument is adjusted to rest on the saw only at the ends of the bowed band $C^4$, and point of adjusting screw L, the center of the bowed band $C^4$ being brought very near, but not quite, in contact with the saw blade. By then bringing the instrument over a lump spot and drawing it carefully from the teeth toward the eye, the lump will be plainly marked by the bowed band $C^4$ coming in contact with it.

The coated surface is prepared for marking with this instrument by rubbing in a circular direction along the base of the teeth.

It is understood that I do not limit myself to holding the bowed band $C^4$ with a wire rod K, as other means may be employed.

As illustrated in the drawings, I have shown the band of even width and strength only, but I do not limit myself to that, as I may vary the strength by adding to or taking from the width of the band at any place along its length. See for instance, Fig. 10; thus obtaining more variety of curve for experimental purposes, than could be readily obtained by the manipulation of screws alone.

As shown in Fig. 10, the stock or holder $A^3$ carries the clamp J' fastening the band $C^5$ in place in the holder, the ends of the said band being engaged by the hooks $K^3$ on the ends of the rod $K^2$.

Having thus fully described my invention, I claim as new and desire to secure by Letters Patent—

1. A saw templet comprising a stock or holder, and a flexible band or blade held adjustably therein, substantially as shown and described.

2. A saw templet comprising a stock or holder, a flexible band or blade held in the said stock or holder, and means, substantially as described, for adjusting the band to the desired curve, substantially as shown and described.

BENJAMIN F. SPOONER.

Witnesses:
C. E. KEPPLER,
M. FALL.